United States Patent
Garg et al.

(10) Patent No.: US 8,073,806 B2
(45) Date of Patent: Dec. 6, 2011

(54) MESSAGE LOG ANALYSIS FOR SYSTEM BEHAVIOR EVALUATION

(75) Inventors: Sachin Garg, Bangalore (IN); Navjot Singh, Denville, NJ (US); Shalini Yajnik, Berkeley Heights, NJ (US); Ranjith Vasireddy, Hyderabad (IN); Sridhar Vasireddy, legal representative, Hyderabad (IN)

(73) Assignee: Avaya Inc., Basking Ridge, NJ (US)

( * ) Notice: Subject to any disclaimer, the term of this patent is extended or adjusted under 35 U.S.C. 154(b) by 843 days.

(21) Appl. No.: 11/874,161

(22) Filed: Oct. 17, 2007

(65) Prior Publication Data

US 2008/0319940 A1 Dec. 25, 2008

Related U.S. Application Data

(60) Provisional application No. 60/945,857, filed on Jun. 22, 2007.

(51) Int. Cl.
*G06F 15/00* (2006.01)
*G06F 15/18* (2006.01)

(52) U.S. Cl. ............ 706/62; 706/45; 706/46; 706/47; 706/48; 706/52; 709/224; 709/225; 709/226

(58) Field of Classification Search .................. None
See application file for complete search history.

(56) References Cited

U.S. PATENT DOCUMENTS

| | | | |
|---|---|---|---|
| 7,689,610 B2 * | 3/2010 | Bansal et al. | 707/999.006 |
| 7,788,536 B1 * | 8/2010 | Qureshi et al. | 714/38 |
| 2005/0038888 A1 * | 2/2005 | Labertz | 709/224 |
| 2005/0114508 A1 * | 5/2005 | DeStefano | 709/224 |
| 2007/0088972 A1 * | 4/2007 | Srivastava et al. | 714/4 |
| 2007/0283194 A1 * | 12/2007 | Villella et al. | 714/57 |
| 2008/0104062 A1 * | 5/2008 | Oliver et al. | 707/5 |
| 2008/0134209 A1 * | 6/2008 | Bansal et al. | 719/317 |

OTHER PUBLICATIONS

"Levenshtein distance", "http://en.wikipedia.org/w/index.php?title=Levenshtein_distance&printabl", Mar. 23, 2009, Publisher: Wikimedia Foundation, Inc., Published in: US, 5 pages.

(Continued)

*Primary Examiner* — Omar Fernandez Rivas
(74) *Attorney, Agent, or Firm* — Maldjian Law Group LLC; John P. Maldjian, Esq.

(57) ABSTRACT

A technique is disclosed that enables the run-time behavior of a data-processing system to be analyzed and, in many cases, to be predicted. In particular, the illustrative embodiment of the present invention comprises i) transforming the messages that constitute an unstructured log into a numerical series and ii) applying a time-series analysis on the resultant series for the purpose of pattern detection. Indeed, it is recognized in the illustrative embodiment that the problem really is to detect patterns that depict aspects of system behavior, regardless of the textual content of the individual log messages. In other words, by analyzing the totality of the messages in the log or logs—as opposed to looking for pre-defined patterns of the individual messages—system behavior can be mapped and understood. The mapping helps in characterizing the system for the purposes of predicting failure, determining the time required to reach stability during failure recovery, and so forth.

18 Claims, 7 Drawing Sheets

OTHER PUBLICATIONS

Mat-Hassan, Mazlita et al, Associating Search and Navigation Behavior Through Log Analysis, Journal of the American Society for Information Science and Technology, 2005 Wiley Periodicals, Inc., Published online Apr. 25, 2005 in Wiley InterScience (www.interscience.wiley.com), pp. 913-934.

Yamanishi, Kenji et al, Dynamic Syslog Mining for Network Failure Monitoring, KDD '05, Aug. 21-24, 2005, Chicago, Illinois, USA, 10 pages.

Levy, Dorron et al, Early Warning of Failures through Alarm Analysis—A Case Study in Telecom Voice Mail Systems, IEEE International Symposium on Software Reliability Engineering (ISSRE 2003) Denver, CO, Nov. 17-20, 2003, pp. 1-10.

Lee, Inhwan et al, Error/Failure Analysis Using Event Logs from Fault Tolerant Systems, IEEE, 1991, pp. 10-17.

Facca, Federico Michele et al, Mining interesting knowledge from weblogs; a survey, www.sciencedirect.com, Data & Knowledge Engineering, 2004 Published by Elsevier B. V., pp. 1-18.

* cited by examiner

MESSAGE LOG ANALYSIS FOR SYSTEM BEHAVIOR EVALUATION

CROSS REFERENCE TO RELATED APPLICATIONS

The following case is incorporated herein by reference: U.S. Patent Application Ser. No. 60/945,857, filed Jun. 22, 2007. If there are any contradictions or inconsistencies in language between this application and the case that has been incorporated by reference that might affect the interpretation of the claims in this case, the claims in this case should be interpreted to be consistent with the language in this case.

FIELD OF THE INVENTION

The present invention relates to telecommunications in general, and, more particularly, to transforming and analyzing textual message logs.

BACKGROUND OF THE INVENTION

Almost all software systems, such as those present in data-processing systems, are programmed to generate textual logs. The messages that are written into the textual logs report on a wide variety of phenomena, such as execution speed, input/output faults, process initiation and termination, and so forth. Based on their formats, textual logs can be classified into two categories: i) structured logs and ii) unstructured logs. Structured logs follow a well-defined syntactic format, while unstructured logs have only a partial structure or no structure at all. Web access logs, transaction logs, and error logs are some examples of structured logs; in a typical product development, they are incorporated into the software while accounting for the related system requirements and in many cases conform to standard programming practices. Trace and debugging logs, in contrast, are examples of unstructured logs; they are incorporated into the software typically not as an outcome of any formalized system requirements, but more as a debugging aid to individual programmers. The messages in such logs do not follow strict patterns and can be classified as unstructured.

The data-processing systems that generate the message logs often comprise large, complex software systems with millions of lines of instructions that have evolved over many years of development. Examples of such data-processing systems in a telecommunications context are routers, switches, servers, and so forth. In turn, each data-processing system is often part of a larger system such as a telecommunications system, within which multiple, networked data-processing systems must work together to provide services to users of devices such as telecommunications terminals. It is important to understand the system behavior of these data-processing systems, in order to maintain or improve their reliability—particularly with respect to a failure condition, in which a software component, or the data-processing system itself, fails to perform as intended. Thus, it is not surprising that some efforts have been made to analyze message logs for the purpose of understanding the behavior of a system.

Most of the previous work on log analysis is based on searching for and mapping a set of pre-defined patterns in a structured log. As an example, web-log mining relies on searching well-known document retrieval patterns from a structured log file. With pre-defined patterns in mind, structured error logs or call logs in some telecommunications systems have been used to analyze and understand the failure process. In particular, user search patterns and user navigation behavior has been studied to improve web site usage and also to provide users with targeted product advertising. Additionally, system anomalies that are detectable through pre-defined patterns in the logs have been used to detect intrusions in deployed systems.

In contrast, unstructured message logs have been largely unused in attempting to understand system behavior, mainly because unstructured logs do not easily lend themselves to automated analysis, because of both the unstructured nature of the messages and the volume of messages that can be generated. For example, consider that in an enterprise Voice over Internet Protocol (VoIP) environment, a data-processing system that provides the call control can generate a million status messages or more per hour as part of the message logs, in which there can be over 100,000 distinct messages. And in many systems, a large number of log files generated are, in fact, unstructured rather than being structured. Consequently, a sizeable portion of log messages overall do not have any pre-defined tags that can be monitored, so the pre-defined pattern techniques in the prior art are somewhat useless here.

What is needed is a technique for leveraging unstructured logs, including partially-structured logs, in order to understand and characterize the behavior of a processing system, specifically with respect to the failure behavior of the system, without some of the disadvantages in the prior art.

SUMMARY OF THE INVENTION

The present invention enables the run-time behavior of a data-processing system to be analyzed and, in many cases, to be predicted. In particular, the illustrative embodiment of the present invention comprises i) transforming the messages that constitute an unstructured log into a numerical series and ii) applying a time-series analysis on the resultant series for the purpose of pattern detection. Indeed, it is recognized in the illustrative embodiment that the problem really is to detect patterns that depict aspects of system behavior, regardless of the textual content of the individual log messages. In other words, by analyzing the totality of the messages in the log or logs—as opposed to looking for pre-defined patterns of the individual messages—system behavior can be mapped and understood. The mapping helps in characterizing the system for the purposes of predicting failure, determining the time required to reach stability during failure recovery, and so forth.

While the basic concept of the present invention might seem straightforward, it is in fact complex because of the huge variety and number of status messages that can be generated in a relatively short period of time. For example, a telecommunications system, such as the call-control system of the illustrative embodiment in an enterprise Voice over Internet Protocol (VoIP) environment, can generate over a million status messages per hour as part of the message logs. Additionally, there can be over 100,000 distinct messages contained in those message logs.

To overcome the problem of complexity, the messages in the message log are classified so that patterns can be seen to emerge in the messages as a whole. In accordance with the technique of the illustrative embodiment, indices are assigned to some or all of the messages within some string distance of one another. The indices are then represented as a time series, in terms of when the messages have been generated. The time series can either be i) presented to a user, possibly as a visual graph on a display, or ii) analyzed to detect patterns. The resulting graph or time-series analysis can then be used to predict system behavior, such as indicating whether a failure, such as a system crash, is about to occur. Applying the illustrative embodiment technique to the log files can be used to ascertain a "signature" of the system state and its transitions, especially in large complex software systems, which are replete with multiple interacting processes and messages being generated and interwoven in often unique combinations. Moreover, determining the system's signature can be done with fine granularity, thereby offering a prediction of system behavior in ways that each single message generated cannot.

The technique of the illustrative embodiment features the analysis of unstructured logs. However, it will be clear to those skilled in the art, after reading this specification, how to make and use alternative embodiments of the present invention that are able to analyze structured logs. Furthermore, while exemplifying the understanding of failure behavior in a telecommunications system, the illustrative embodiment technique is also applicable to understanding behavior in other types of systems and to mapping other types of behavior such as that related to intrusions, frauds, anomalies, and so forth.

The illustrative embodiment of the present invention comprises: mapping a first plurality of messages from a message log to a mapped plurality of numerical values; performing a time-series analysis on the mapped plurality with respect to when the corresponding messages from the first plurality occur in time; and transmitting a signal that represents a characteristic of the time-series analysis.

DETAILED DESCRIPTION

Figure 1:
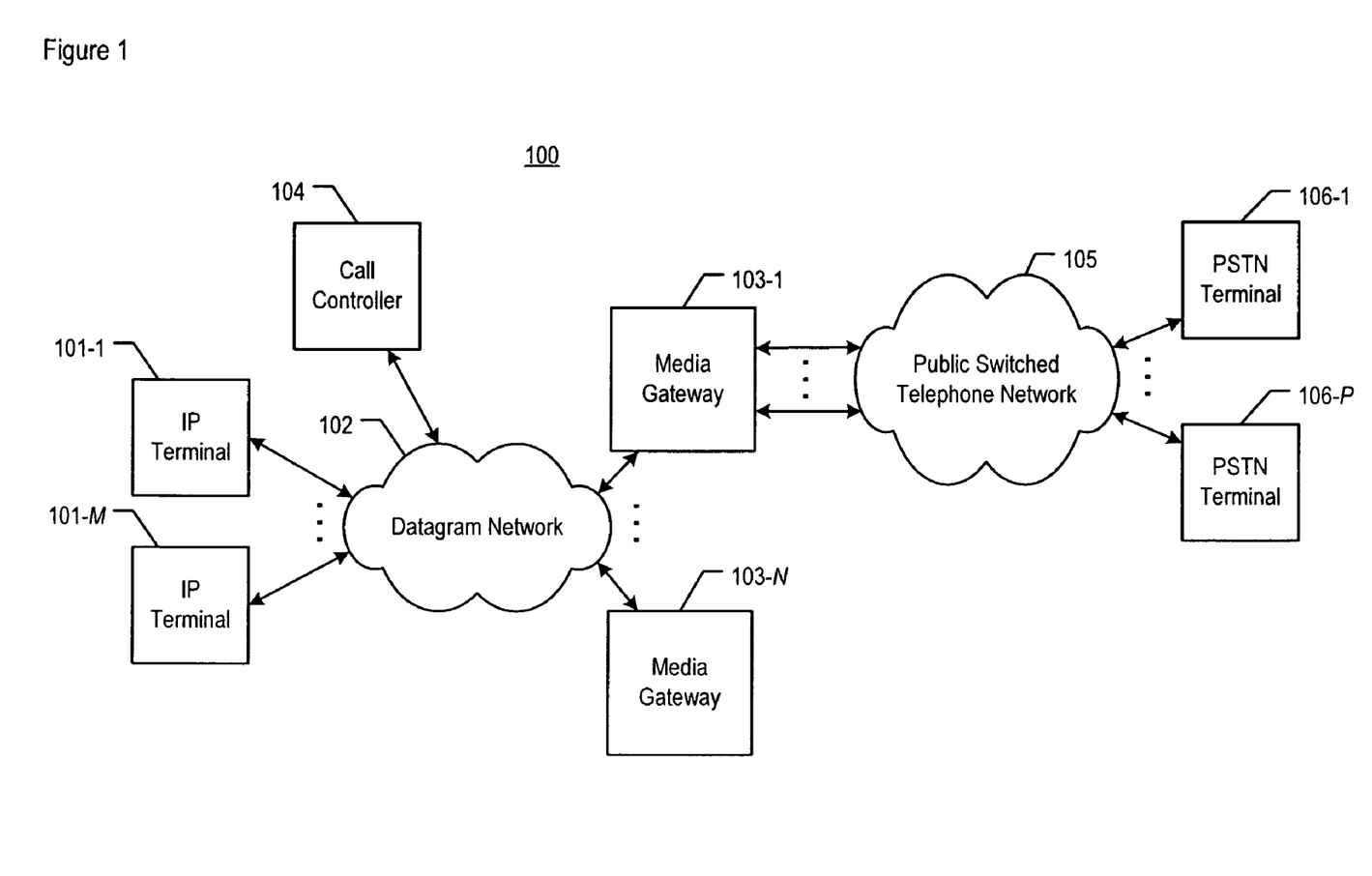
FIG. 1 depicts telecommunications system 100 in accordance with the illustrative embodiment of the present invention.

FIG. 1 depicts telecommunications system 100 in accordance with the illustrative embodiment of the present invention. Telecommunications system 100 comprises an enterprise Voice over Internet Protocol (VoIP) system that sets up and controls voice conversations between end-user devices such as Internet Protocol-based (IP-based) phones and Public Switched Telephone Network (PSTN) phones. The VoIP system depicted in FIG. 1 comprises several components that communicate with each other in order to provide voice telephony service to end users. These components include IP phones, as represented by Internet Protocol terminals 101-1 through 101-M, where M is a positive integer; IP-based network 102; gateways 103-1 through 103-N, wherein N is a positive integer; and call controller 104. Additionally, system 100 comprises Public-Switched Telephone Network 105; and PSTN phones, as represented by terminals 106-1 through 106-P, where P is a positive integer. The components of system 100 are interconnected as shown.

Network 102 is a datagram network that interconnects the IP-based components of system 100. Network 102 is made up of a plurality of specialized networks that include i) an IP-based local area network that directly serves terminals 101-1 through 101-M and ii) an IP-based backbone network that interconnects the local area network, gateways 103-1 through 103-N, and call controller 104. As those who are skilled in the art will appreciate, network 102 can comprise other types of networks and can be used to interconnect devices other than those depicted. In any event, it will be clear to those skilled in the art how to make and use network 102.

Gateway 103-n, where n has a value between 1 and N, interconnects the IP-based portion of system 100 with another type of network, such as Public Switched Telephone Network 105. Each gateway terminates and converts various media streams between the telecommunications terminals that cannot communicate directly with one another, such as IP terminal 101-m, where m has a value between 1 and M, and PSTN terminal 106-p, where p has a value between 1 and P. In some embodiments, each gateway is controlled by call controller 104, while in some alternative embodiments each gateway is controlled by other means. It will be clear to those skilled in the art how to make and use gateway 103-n.

Call controller 104 is a data-processing system that provides the majority of the call control of the depicted VoIP system. It uses call signaling protocols such as H.323 and Session Initiation Protocol (SIP) to perform various control-related tasks such as phone authentication and registration, call routing, call signaling, and call initiation and release. Controller 104, in some embodiments, also controls the gateways and instructs them to perform specific media codec transformations, as are known in the art. Additionally, controller 104 performs all Operations Management Administration and Provisioning (OAM&P) functions including the generation of call detail records (CDRs). Call controller 104 is further capable of performing the tasks described below and with respect to FIGS. 3 through 6.

In accordance with the illustrative embodiment, a single call controller supports hundreds of thousands of IP phones, such as terminal 101-m, with loads of similar scale in terms of peak busy-hour calls. As those who are skilled in the art will appreciate, however, a telecommunications system can have more than a single call controller present.

Figure 2:
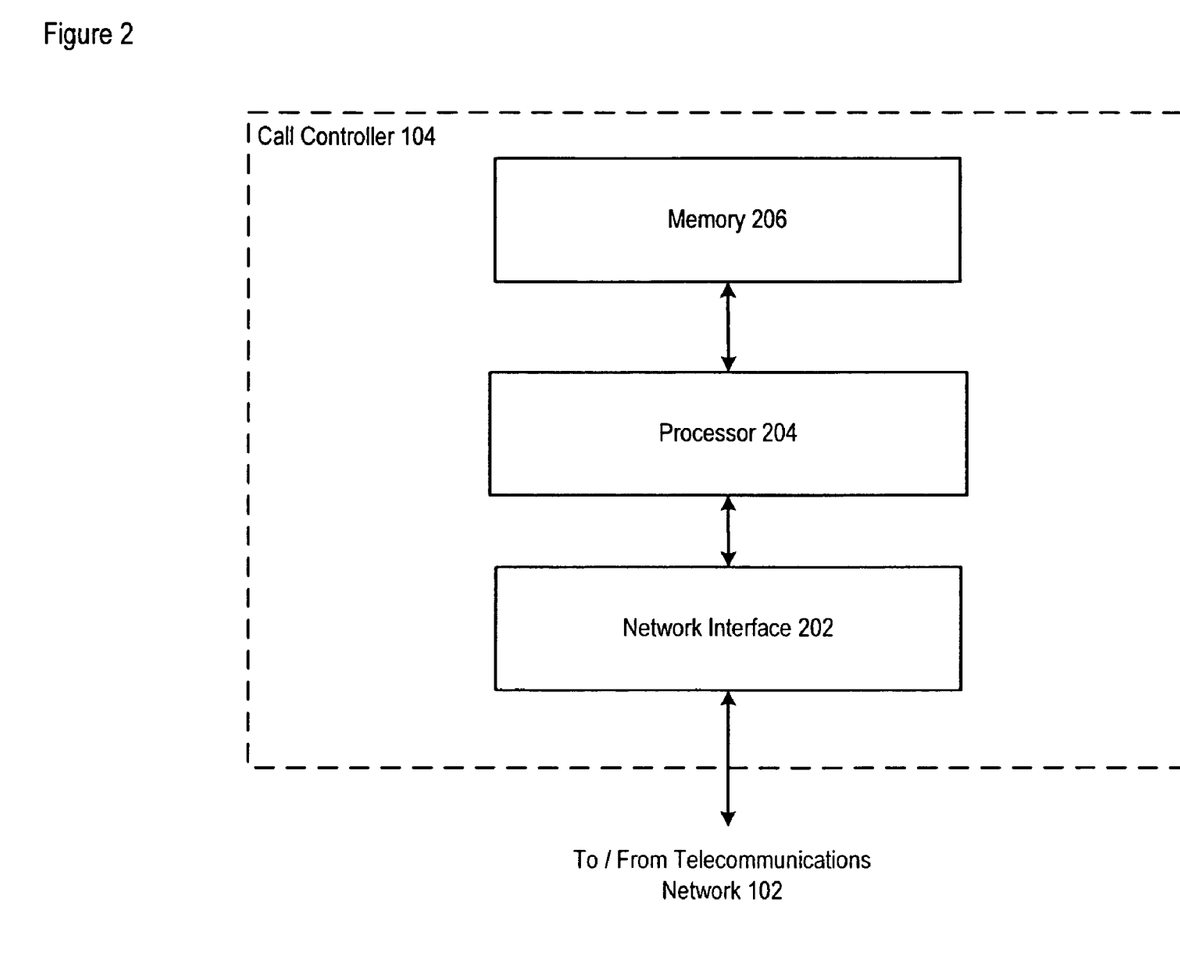
FIG. 2 depicts the salient components of call controller 104 of system 100.

FIG. 2 depicts the salient components of call controller 104, in accordance with the illustrative embodiment of the present invention. Controller 104 comprises network interface 202, processor 204, and memory 206, interconnected as shown.

Network interface 202 comprises the circuitry that enables controller 104 to exchange call-controlling signals with one or more other network elements in telecommunications system 100, in well-known fashion. In accordance with the illustrative embodiment, controller 104 receives and transmits signaling information for telephone calls that is represented in Internet Protocol packets, in well-known fashion. As those who are skilled in the art will appreciate, in some alternative embodiments controller 104 receives and transmits signaling information that is represented in a different format.

Processor 204 is a general-purpose processor that is capable of receiving information from network interface 202, of executing instructions stored in memory 206, of reading data from and writing data into memory 206, and of transmitting information to network interface 202. In some alternative embodiments of the present invention, processor 204 might be a special-purpose processor. In addition to providing the call-control for the depicted terminals, processor 204 writes messages to the logs. In accordance with the illustrative embodiment, processor 204 performs the salient tasks that are described below and with respect to FIGS. 3 through 6, in performing the log analysis.

Memory 206 stores the software instructions and data used by processor 204, in well-known fashion, as well as one or more message logs that are used in accordance with the illustrative embodiment of the present invention. The memory might be any combination of dynamic random-access memory (RAM), flash memory, disk drive memory, and so forth.

From a software perspective, call controller 104 is a large and complex system that is representative of systems with millions of lines of instructions that have evolved over many years of development. During operation, controller 104 performs a variety of concurrently-running processes, which handle the computing and communication tasks described herein. Each process that is executed by processor 204 writes trace messages into a shared log file stored in memory 206. The messages from the processes are interleaved together in the log file. Neighboring messages in the log may be related to each other or may be completely independent.

Table 1 depicts an example of a log generated by two illustrative processes that run at call controller 104, namely proc1 and proc2. The log follows the pattern of Date:Time: Sequence:ProcessName (PID):Priority:Log Message. The "log message" part of the log comprises logging messages and debug messages that are generated by each process.

TABLE 1

20060118:032918946:2445:proc1(2548):HIGH:[timRestVar: time thread TO SLEEP]
20060118:033026975:2446:proc2(2249):HIGH:[IntchgReqFail: errcode=1]
20060118:033026975:2447:proc2(2249):MED:[IntchgMtce: NOREQ->REJCT]
20060118:033027280:2448:proc2(2249):MED:[IntchgMtce: GRANT/REJECT check 0]
20060118:033027977:2449:proc2(2249):MED:[IntchgMtce: REJCT->NOREQ]
20060118:033036818:2450:proc2(2249):MED:[IntchgMtce: NOREQ->COMEH]
20060118:033116820:2451:proc2(2249):MED:[Being told to Go Active!!!]
20060118:033116820:2453:proc2(2249):MED:[State of other side is Handoff]
20060118:033116820:2454:proc2(2249):MED:[STANDBY->ACTIVE :interchange request]
20060118:033116820:2455:proc2(2249):MED:[State Transition: STANDBY to ACTIVE ]
20060118:033116820:2456:proc2(2249):MED:[reset\_active\_timer: bucket 17.0 to 0]
20060118:033116820:2457:proc2(2249):HIGH:[dupmem\_rxoff called]
20060118:033116821:2458:proc2(2249):HIGH:[Shadowing stopped by proc2: to ACTIVE]

As can be seen from the sample log above, although the initial part of each message does provide a partial structure to the log, the "log message" part of each line does not follow any strict pattern and, as such, can be classified as being unstructured.

FIGS. 3 through 6 depict flowcharts of the salient tasks that are related to transforming and analyzing a message log, as performed by call controller 104, in accordance with the illustrative embodiment of the present invention. As those who are skilled in the art will appreciate, some of the tasks that appear in the flowcharts can be performed in parallel or in different orders than those depicted. Moreover, those who are skilled in the art will further appreciate that in some alternative embodiments of the present invention, only a subset of the depicted tasks are performed. Although controller 104 performs the tasks of the illustrative embodiment, those who are skilled in the art will appreciate that a different data-processing system can perform some or all of the depicted tasks.

Overview of Tasks

Figure 3:
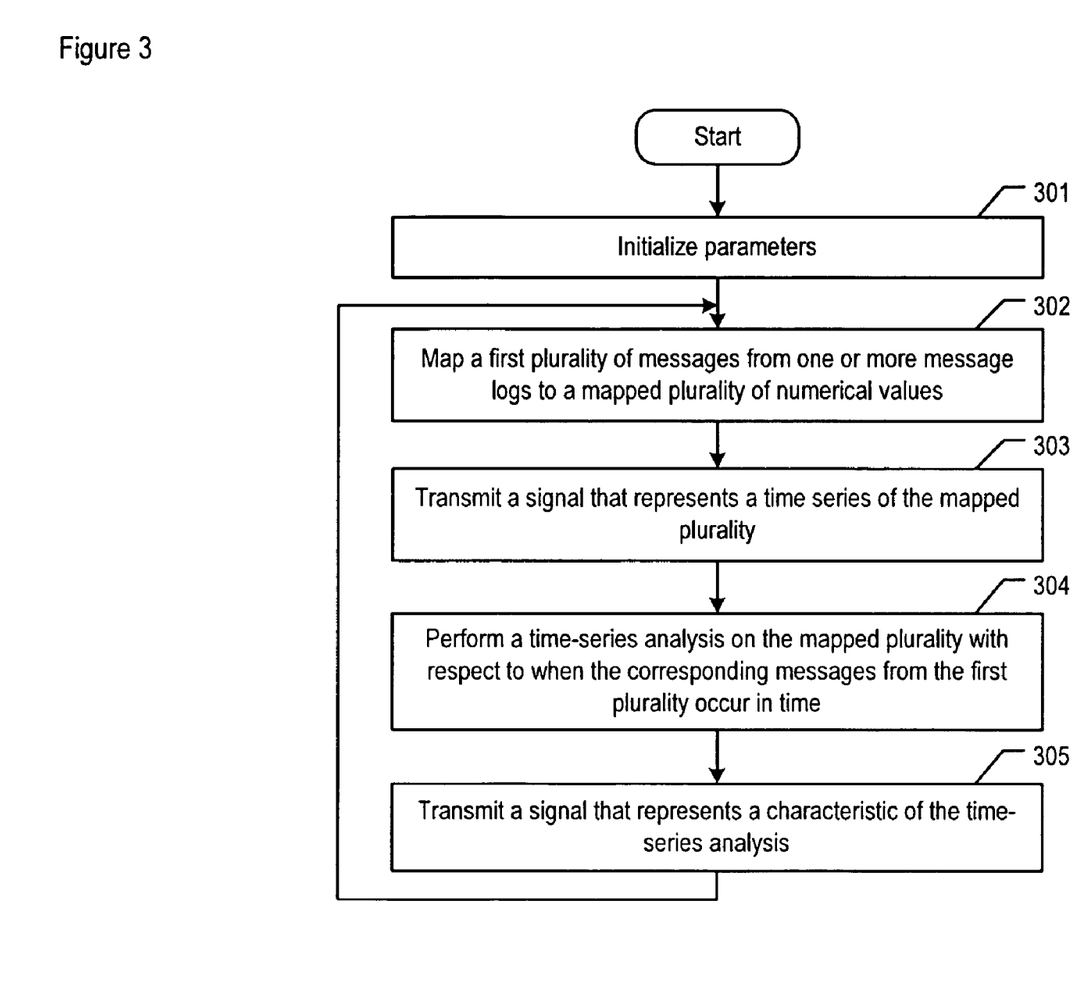
FIG. 3 depicts the overall tasks associated with the message log transformation and analysis of the illustrative embodiment.

FIG. 3 depicts the overall tasks that are associated with message log transformation and analysis.

At task 301, controller 104 initializes the set of parameters that will be used for transforming and analyzing one or more of the message logs. The initialization includes determining the reference string used with respect to tasks 503 and 602, as well as the substring partitioning used with respect to task 601. The initialized parameters are described below and with respect to the tasks in which they are used.

At task 302, controller 104 maps a first plurality of messages from one or more message logs to a mapped plurality of numerical values. The mapping can be accomplished in one of at least two ways, namely through a sort-based transformation or through a weighted distance-based transformation, in accordance with the illustrative embodiment. The sort-based transformation is described below with respect to FIG. 4, and the weighted distance-based transformation is described below with respect to FIGS. 5 and 6. As those who are skilled in the art will appreciate, after reading this specification, other methods of transformation may be used to map the log messages to the numerical values.

At task 303, controller 104 transmits a signal that represents a time series of the mapped plurality of numerical values. This signal can be used to provide system status to a user (e.g., a developer, an administrator, etc.) and, for example, can be used to convey a graph of the mapped plurality as a function of time. When a graph is generated from a log after a transformation, a concentration of messages in a particular section of the graph might, for example, alert the user of potential problems in some portion of the code. An illustrative example of such a time series is described below and with respect to FIGS. 7A and 7B. Even the visual appeal of a transformed log without a subsequent time-series analysis would be acceptable to some users, in that the visual plot reveals a signature of a particular system's deployment.

At task 304, controller 104 performs a time-series analysis on the mapped plurality with respect to when the corresponding messages from the first plurality occur in time. An example of such an analysis is the calculation of message density versus time.

At task 305, controller 104 transmits a signal that represents a characteristic of the time-series analysis. This signal can be used to provide system status to a user such as a technician or can be used to initiate another function, such as a rebooting of controller 104, or of some other data-processing system within telecommunications system 100.

Tasks 302 through 305 can be repeated either periodically or sporadically, either as part of ongoing analysis of system performance or as needed.

Sort-Based Transformation

Figure 4:
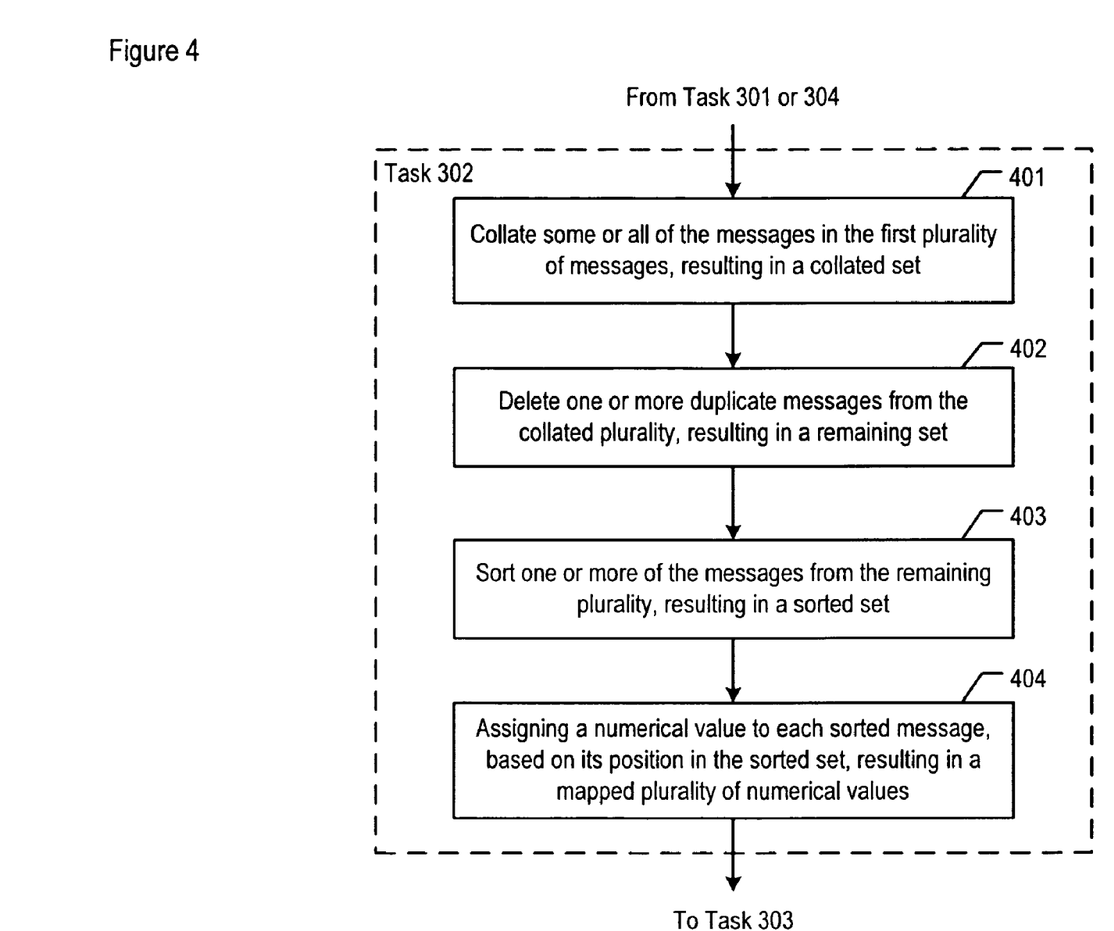
FIG. 4 depicts the salient tasks of the sort-based transformation of the illustrative embodiment.

FIG. 4 depicts the salient tasks of a sort-based transformation, in accordance with the illustrative embodiment of the present invention. The sort-based transformation is a technique that can be performed offline—that is, not on messages as they are being generated by controller 104. Either controller 104 or another data-processing system can perform the sort-based transformation.

In accordance with the illustrative embodiment, all of the message log data to be transformed and analyzed are already available, as the data has already been stored in memory at controller 104 during the part of the controller's real-time operation that has already occurred.

At task 401, controller 104 collates some or all of the log messages that have been generated, across one or more of the logs. For example, in accordance with the technique of the illustrative embodiment, controller 104 can extract the log message part of each message in each log and then build a set of all log message parts of the multiple logs.

At task 402, controller 104 deletes duplicate messages, in order to reduce the amount of data to be analyzed.

At task 403, controller 104 performs a string-based sort technique on the plurality of unique messages from the message log, in well-known fashion, in order to sort the elements of this set.

At task 404, controller 104 assigns a numerical value to each sorted message in the set, based on that message's position in the sorted set. This numerical value acts as a message index for the corresponding log message. The characteristic of this technique is that textually-similar messages get indices that are "close" together. The closeness of the messages can be measured in terms of the Levenshtein distance or the Hamming distance, as are well-known in the art.

For example, Table 2 gives one such mapping generated by the sort-based transformation of the illustrative embodiment. As depicted, the log message is to the right of the arrow. The information to left of the arrow is the message index assigned to the log message, based on its position in the sorted set. As can be seen, sorting is textual and messages that are textually close together get assigned nearby numbers.

TABLE 2

333830 --> CM3\_proc\_err:
 pro=7232,err=203,seq=4004,da1=83900416(0x5003800),da2=0(0x0)]
333831 --> CM3\_proc\_err:
 pro=7232,err=203,seq=4004,da1=8704(0x2200),da2=0(0x0)]
333832 --> CM3\_proc\_err:
 pro=7232,err=203,seq=4004,da1=9472(0x2500),da2=0(0x0)]
333833 --> COM\_ERR: err=170, da1=-1(0xffffffff), da2=113(0x71),
 da3=615(0x267)]
333834 --> COM\_ERR: err=172, da1=49152(0xc000), da2=112(0x70),
 da3=604(0x25c)]
333835 --> COM\_ERR: err=172, da1=49152(0xc000), da2=113(0x71),
 da3=604(0x25c)]

Once the message indices have been assigned to all of messages in the unique set, a given system log is processed to create a time series, where the log message part of each line of the log is mapped to its corresponding message index. The time series is then provided to a user or analyzed to detect patterns, or both, at tasks 303 and beyond.

Textual sorting helps to cluster messages based on their similarity, which is an important factor in visualizing system behavior. For example, a line of the code that generates the same error message with different parameters will result in different log messages in the set. However, due to the similarity in the text, the messages will appear close together in the sorted set, thereby getting message indices that are near each other.

Weight Distance-Based Transformation

Figure 5:
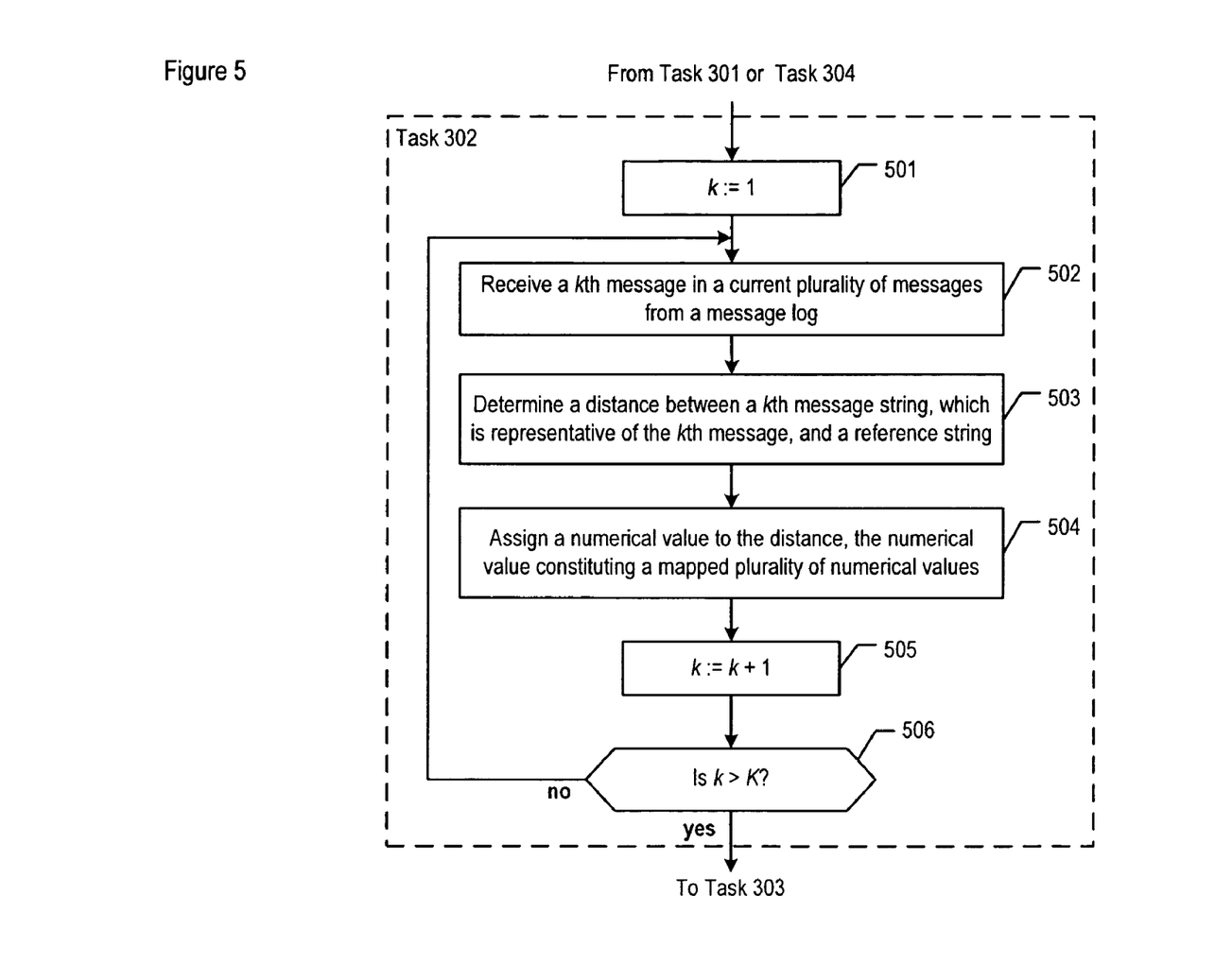
FIG. 5 depicts the salient tasks of the weight distance-based transformation of the illustrative embodiment.

FIG. 5 depicts the salient tasks of a weight distance-based transformation, in accordance with the illustrative embodiment of the present invention. The weight distance-based transformation is a technique that can be performed on an ongoing basis with the call control that is being performed by controller 104. In fact, this scheme is distinct from the sort-based scheme in that it does not require a priori knowledge of the entire message set; as a result, the transformations can be performed on an ongoing basis while the messages are generated. Either controller 104 or another data-processing system can perform the weight distance-based transformation.

At task 501, controller 104 initializes a counter to keep track of the current segment of message log data that is to be processed. As those who are skilled in the art will appreciate, there are various ways to determine where or when the next segment of message log data to be analyzed starts and ends.

At task 502, controller 104 receives a recently-generated message string that appears in a message log, in well-known fashion.

At task 503, controller 104 calculates a weighted distance of the received string from a reference string. This process is described in detail below and with respect to FIG. 6.

At task 504, controller 104 assigns a numerical value to the weighted distance that is calculated. This numerical value acts as a message index for the corresponding log message. As with the sort-based transformation described earlier, textually-similar messages wind up getting indices that are "close" together. The closeness of the messages can be expressed in terms of the Levenshtein distance or the Hamming distance, as are well-known in the art.

At task 505, controller 104 increments the message pointer to point to the next message to be processed.

At task 506, controller 104 determines whether the final message of the current segment of message log data has been processed. If it has not, task execution proceeds back to task 502. Otherwise, task execution proceeds to task 303 for the purposes of notifying a user or performing the time-series analysis, or both.

Figure 6:
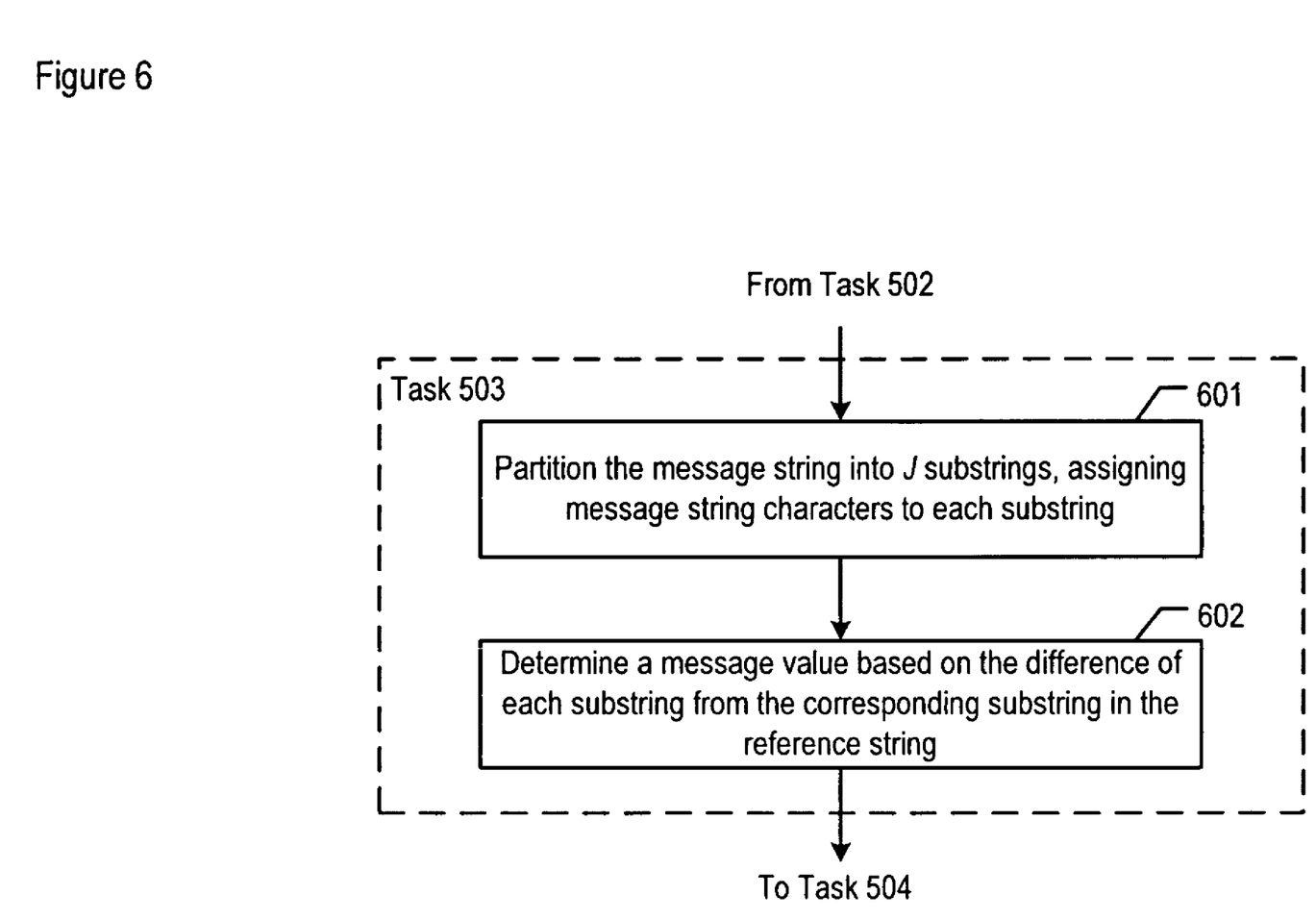
FIG. 6 depicts the subtasks that are associated with distance-based transformation, which involves the determining of the distance between the current message string and a reference string.

FIG. 6 depicts the subtasks that are associated with task 503, which involves the determination of the distance between the current message string and a reference string. The value of the reference string is selected at initialization task 301 for the purpose of conditioning the transformation results. For example, in some embodiments, the reference string is selected with the goals in mind of i) obtaining unique message indices for the different message strings and ii) keeping the message indices of similar-looking messages close together. The reference string remains the same throughout the transformation of the current segment of messages that are processed.

At task 601, the message string is partitioned into J substrings, and weights are given to each substring based on the position of the string in the message. The substrings that appear at the beginning of the message are given higher weights. The effect of this is to create clusters that are similar to those of the sort-based scheme. The lengths of the substrings might all be the same, or some or all of them might be different from one another. Furthermore, the last substring may comprise a variable number of characters, depending on the overall length of the message string.

At task 602, Once the message has been partitioned, the distance of each substring from a reference string is calculated and the transformation is obtained using the following rule:

$$\text{Message index} = \sum_{j=1}^{J} ((D_j) \bmod_{10}) * 10^{J-j},$$

where J is the total number of substrings, and $D_j$ is the distance of the substring j from the corresponding substring in the reference string. As those who are skilled in the art will appreciate, in some alternative embodiments other rules can be used to form the message index from the constituent distances.

The parameters for partitioning of the message string, such as the number of partitions, J, and the size of each partition, are determined a priori at task 301 through heuristics based on the estimated number of possible messages originating from the system.

Table 3 shows the application of a weight distance-based transformation on same subset of messages depicted in Table 2.

TABLE 3

869500 --> CM3\_proc\_err:
  pro=7232,err=203,seq=4004,da1=83900416(0x5003800),da2=0(0x0)]
832000 --> CM3\_proc\_err:
  pro=7232,err=203,seq=4004,da1=8704(0x2200),da2=0(0x0)]
865000 --> CM3\_proc\_err:
  pro=7232,err=203,seq=4004,da1=9472(0x2500),da2=0(0x0)]
558000 --> COM\_ERR: err=170, da1=-1(0xffffffff), da2=113(0x71), da3=615(0x267)]
143000 --> COM\_ERR: err=172, da1=49152(0xc000), da2=112(0x70), da3=604(0x25c)]
163000 --> COM\_ERR: err=172, da1=49152(0xc000), da2=113(0x71), da3=604(0x25c)]

The above transformation results were obtained by partitioning the message string into six substrings (i.e., J is equal to six), with the size of the first four substrings being 25 characters and the size of the fifth substring being 100 characters. After assigning the characters to the first five substrings, any characters that remain are assigned to the sixth (last) substring.

Time-Series Analysis

Figure 7A:
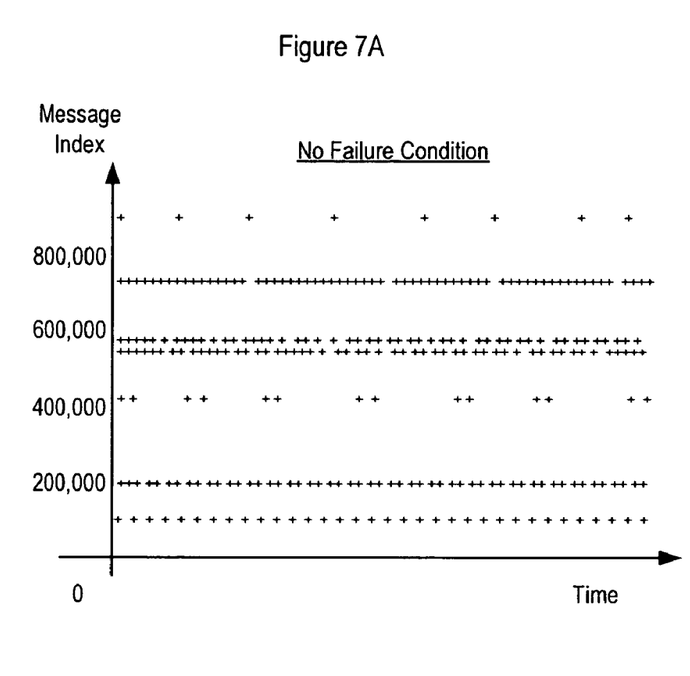
FIGS. 7A and 7B show illustrative examples of different time series that can be obtained by applying one of the transformation techniques of the illustrative embodiment.
Figure 7B:
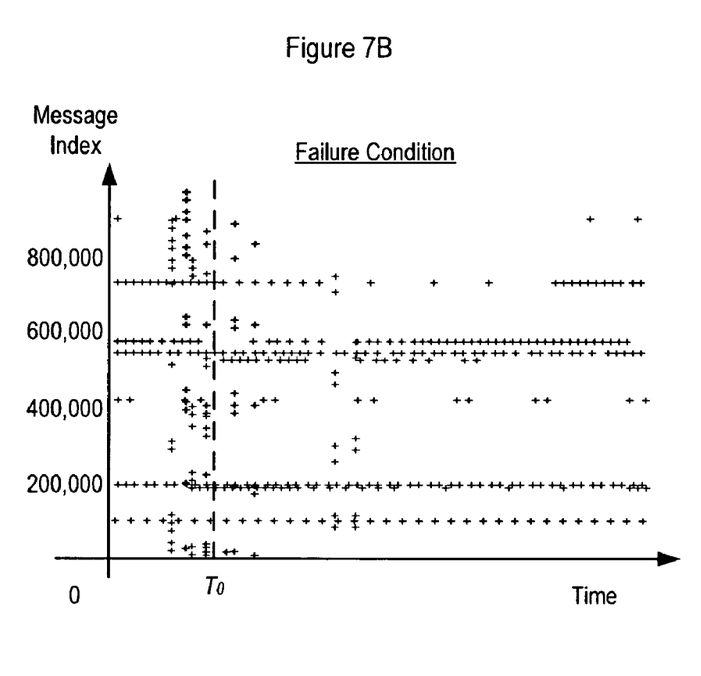

FIGS. 7A and 7B show illustrative examples of different time series that can be obtained by applying one of the transformation techniques of the illustrative embodiment. The plots show the distinct differences between non-failure behavior (depicted in FIG. 7A) and failure behavior (depicted in FIG. 7B) of call controller 104. Each plot shows each message as a function of when the message was generated, where a message is represented by its message index calculated in accordance with the illustrative embodiment.

The plot of the transformation of the non-failure log shows a repetitive, uniform behavior of generated messages, with messages of the same type—and, therefore, having the same index or a similar index—being generated over time. In contrast, the plot of the transformation of the failure logs shows varying behavior. For example, one failure symptom as evidenced by the failure plot is an increase in the message activity levels in the pre-failure stage, where the failure itself is marked in time by the vertical dashed line at time $T_0$. Another failure symptom is a continuation of the increased activity levels during the failure and recovery stages (i.e., at time $T_0$ and later). As those who are skilled in the art will appreciate, however, other types of failure in another data-processing system might be marked by a different pattern of pre-failure/post-failure messages, such as a change in message activity during the failure and recovery stages without a change in message activity during the pre-failure stage.

The time-series analysis of the illustrative embodiment is used to evaluate one or more aspects of the time series that are related to message occurrences, in order to predict when a failure might actually occur. Such an analysis might involve, for example, deriving the number of messages per time interval or the message density, based on the time series data shown in FIGS. 7A and 7B. If there is an error in the software that builds up to a failure, the trace and debug logs can show an increased number of messages originating from the error condition, as shown in FIG. 7B. Post-failure behavior can also be observed through changes in message density. That is, there can be an increase in message activity while the system is going through recovery, as is also shown in FIG. 7B.

A user might be interested in at least determining the time-to-stability behavior of the system after a failure has occurred. After all, not all failures are predictable, but having an understanding of the post-failure behavior of a system might help to determine a better or faster recovery process. Controller 104 might evaluate the message density, for example, to determine the post-failure behavior. As a first example, a first plot of message density for a first type of failure might show high levels of message activity during failure, with the activity levels sharply decreasing and achieving a normal, non-failure state within a few minutes after failure. As a second example, a second plot of message density for a second type of failure might show lingering failure behavior where the increased message activity levels do not subside for a longer time after failure. As a third example, a third plot of message density for a third type of failure might show that the increased message activity levels subside immediately after failure.

In some cases, the transformations described earlier can give rise to false clustering, whereby messages from completely independent portions of the code get mapped to nearby message indices. As an example, this would occur if developers use copy-and-paste techniques to create similar looking messages in completely independent sections of the code. The time-series analysis, however, aims to compare "failure log" behavior, such as in FIG. 7B, with "clean log" behavior, such as FIG. 7A. Therefore, the significance of the analysis can be in the difference between the two log signatures and is not necessarily in the absolute signature of a failure log. Hence, impact of the false clustering on the subsequent analysis should be minimal, if there is any impact at all.

As those who are skilled in the art will appreciate, other time-series analysis methods can be used in order to predict system behavior such as failure behavior. One such method involves performing auto-correlation. Furthermore, although uni-variate analysis techniques have been described herein, those who are skilled in the art will appreciate that multi-variate time series analysis, such as cross-correlation between messages from different processes, can be used to evaluate and predict system behavior.

In addition to evaluating system behavior with respect to software reliability, the technique of the illustrative embodiment can be applied to system security, where anomaly detection techniques can be effectively used to make quantitative statements about intrusions. For example, the technique of the illustrative embodiment can be used to detect and react to SPAM over Internet Telephony (or "SPIT") attacks. As those who are skilled in the art will appreciate, the technique of the illustrative embodiment can be applied to understanding and predicting other aspects of system behavior, and basing an action on the prediction, such as blocking a particular message source or rebooting the system.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
  mapping, by a controller, a first plurality of messages from a message log to a mapped plurality of numerical values, wherein each numerical value from the mapped plurality of numerical values is mapped to only one message from the first plurality of messages;

performing, by the controller, a time-series analysis on the mapped plurality of numerical values with respect to when corresponding messages from the first plurality of messages occur in time; and transmitting, by the controller, a signal that represents a characteristic of the time-series analysis;

wherein the controller comprises a processor coupled to memory.

2. The method of claim 1 wherein the mapping of the first plurality comprises:

sorting, by the controller, the first plurality of messages via a string-based sort technique into a sorted set of sorted messages; and assigning, by the controller, a numerical value to each sorted message based on its position in the sorted set, the numerical value constituting the mapped plurality.

3. The method of claim 2 wherein the sorting is based on the Levenshtein distance between the messages in the first plurality.

4. The method of claim 1 wherein the mapping of the first plurality comprises:

receiving, by the controller, a first message in the first plurality of messages;

determining, by the controller, a distance between a first message string, which is representative of the first message, and a reference string; and assigning, by the controller, a numerical value to the distance, the numerical value constituting the mapped plurality.

5. The method of claim 4 wherein the distance is based on one of the Levenshtein distance and the Hamming distance.

6. The method of claim 5 further comprising:

partitioning, by the controller, the first message into J multiple substrings, J being an integer greater than one; and assigning, by the controller, weights to each substring based on the position of the string in the first message, the weighted set of substrings resulting in the first message string.

7. The method of claim 6 wherein the value of J is based on an estimated number of possible messages in the message log.

8. The method of claim 1 further comprising re-booting a data-processing system, based on the transmitted signal that represents a characteristic of the time-series analysis.

9. A method comprising:

sorting, by a controller, a first plurality of messages from a message log via a string-based sort technique into a sorted set of messages, wherein the sorted set of messages comprises all messages from the first plurality;

assigning, by the controller, a unique index to each of the sorted messages to form a non-empty set of indexes, wherein:

(i) each index in the non-empty set of indexes is assigned to only one message from the first plurality of messages, and (ii) each index in the non-empty set of indexes is assigned to a corresponding message based on the position of the corresponding message in the sorted set of messages;

performing, by the controller, a time-series analysis on the non-empty set of indexes with respect to when corresponding messages from the first plurality of messages occur in time; and transmitting, by the controller, a signal that represents a characteristic of the time-series analysis;

wherein the controller comprises a processor coupled to memory.

10. The method of claim 9 wherein the sorting is based on the Levenshtein distance between the messages in the first plurality of messages.

11. The method of claim 9 further comprising collating, by the controller, a second plurality of messages from the message log, resulting in a collated set of messages that comprises the first plurality.

12. The method of claim 11 further comprising deleting, by the controller, of at least one duplicate message from the collated set, resulting in a remaining set of messages that comprises the first plurality.

13. The method of claim 9 wherein the performing of the time-series analysis involves determining, by the controller, of a message density of the non-empty set of indexes.

14. The method of claim 9 further comprising re-booting a data-processing system, based on the transmitted signal that represents a characteristic of the time-series analysis.

15. A method comprising:

receiving, by a controller, a first message in a first plurality of messages from a message log;

determining, by the controller, a distance between a first message string, which is representative of the first message, and a reference string, wherein the determining includes:

(i) partitioning the first message into J multiple substrings, J being an integer greater than one and wherein the value of J is based on an estimated number of possible messages in the message log, and (ii) assigning, by the controller, weights to each substring based on the position of the string in the first message, the weighted set of substrings resulting in the first message string;

assigning, by the controller, a numerical value to the distance, the numerical value constituting a mapped plurality of numerical values;

performing, by the controller, a time-series analysis on the mapped plurality with respect to when corresponding messages from the first plurality occur in time; and transmitting, by the controller, a signal that represents a characteristic of the time-series analysis;

wherein the controller comprises a processor coupled to memory.

16. The method of claim 15 wherein the distance is based on the Levenshtein distance.

17. The method of claim 15 wherein the performing of the time-series analysis involves determining a message density of the mapped plurality.

18. The method of claim 15 further comprising re-booting a data-processing system, based on the transmitted signal that represents a characteristic of the time-series analysis.

* * * * *